(12) United States Patent
Jeong et al.

(10) Patent No.: US 11,413,596 B2
(45) Date of Patent: Aug. 16, 2022

(54) METHOD FOR SEPARATING CARBON ISOTOPE AND METHOD FOR CONCENTRATING CARBON ISOTOPE USING THE SAME

(71) Applicant: KOREA ATOMIC ENERGY RESEARCH INSTITUTE, Daejeon (KR)

(72) Inventors: Do-Young Jeong, Daejeon (KR); Lim Lee, Daejeon (KR); Yonghee Kim, Daejeon (KR); Hyounmin Park, Daejeon (KR); Kwang-Hoon Ko, Daejeon (KR); Taek-Soo Kim, Daejeon (KR); Seong Yong Oh, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 273 days.

(21) Appl. No.: 16/514,451

(22) Filed: Jul. 17, 2019

(65) Prior Publication Data
US 2020/0164337 A1 May 28, 2020

(30) Foreign Application Priority Data
Nov. 27, 2018 (KR) .................. 10-2018-0148969

(51) Int. Cl.
*B01J 19/12* (2006.01)
*C01B 32/50* (2017.01)
(Continued)

(52) U.S. Cl.
CPC .............. *B01J 19/121* (2013.01); *C01B 3/22* (2013.01); *C01B 3/506* (2013.01); *C01B 32/40* (2017.08);
(Continued)

(58) Field of Classification Search
CPC .............. B01J 19/121; B01J 2219/0875; B01J 2219/12; B01J 19/08; C01B 32/50;
(Continued)

(56) References Cited

U.S. PATENT DOCUMENTS 3,947,335 A * 3/1976 Marling ................. B01J 19/121
204/157.22
3,983,020 A * 9/1976 Moore .................... B01D 59/34
204/157.22
(Continued)

FOREIGN PATENT DOCUMENTS

JP   H03-60722 A   3/1991
JP   H 0360722 A   3/1991
(Continued)

OTHER PUBLICATIONS

Ernest et al., "Radical Quantum Yields from Formaldehyde Photolysis in the 30 400-32 890 cm-1 (304-329 nm) Spectral Region: Detection of Radical Photoproducts Using Pulsed Laser Photolysis-Pulsed Laser Induced Fluorescence," J. Phys. Chem. A 2012, 116, 6983-6995 (Year: 2012).*
(Continued)

*Primary Examiner* — Nicholas A Smith
(74) *Attorney, Agent, or Firm* — Fox Rothschild LLP

(57) ABSTRACT

The present disclosure relates to a method for separating a carbon isotope and a method for concentrating a carbon isotope using the same, the method for separating a carbon isotope including: cooling a formaldehyde gas to a temperature of from 190K to 250K; and obtaining a mixed gas and residual formaldehyde by photodissociating the cooled formaldehyde gas, the mixed gas including carbon dioxide containing a carbon isotope and hydrogen.

7 Claims, 2 Drawing Sheets

(51) Int. Cl.
*C01B 3/22* (2006.01)
*C01B 3/50* (2006.01)
*C01B 32/40* (2017.01)
*F25J 3/06* (2006.01)

(52) U.S. Cl.
CPC ............. *C01B 32/50* (2017.08); *F25J 3/0655* (2013.01); *F25J 3/0665* (2013.01); *B01J 2219/0875* (2013.01); *B01J 2219/12* (2013.01); *C01B 2203/0272* (2013.01); *C01B 2203/046* (2013.01); *C01B 2203/0883* (2013.01); *C01B 2203/1211* (2013.01); *C01P 2006/88* (2013.01)

(58) Field of Classification Search
CPC ........... C01B 3/22; C01B 3/506; C01B 32/40; C01B 2203/0272; C01B 2203/1211; C01B 2203/0883; C01B 2203/046; F25J 3/0655; F25J 3/0665; C01P 2006/88; B01D 59/50; B01D 59/08; B01D 59/34; C07B 2200/05
USPC ... 204/157.46, 157.5, 157.52, 157.21, 157.2, 204/157.22
See application file for complete search history.

(56) References Cited

U.S. PATENT DOCUMENTS

| | | | |
|---|---|---|---|
| 4,029,558 A | 6/1977 | Marling | |
| 4,029,559 A | 6/1977 | Marling | |
| 4,212,717 A | 7/1980 | Moore et al. | |
| 4,213,836 A * | 7/1980 | Freund | B01D 59/34 204/157.22 |
| 4,437,958 A | 3/1984 | Rockwood et al. | |
| 4,780,116 A * | 10/1988 | Cheh | B01D 53/025 96/102 |
| 8,337,802 B2 | 12/2012 | Kihara et al. | |
| 2014/0301938 A1* | 10/2014 | Jeong | B01D 59/34 422/186.3 |
| 2020/0156938 A1 | 5/2020 | Jeong et al. | |

FOREIGN PATENT DOCUMENTS

| | | |
|---|---|---|
| JP | H06-63361 A | 3/1994 |
| JP | H 0663361 A | 3/1994 |
| JP | H06-182158 A | 7/1994 |
| JP | H 06182158 A | 7/1994 |
| JP | 6082898 B2 | 2/2017 |
| JP | 2020-082069 A | 6/2020 |
| KR | 101329082 B1 | 11/2013 |
| WO | 2013/077528 A1 | 5/2013 |

OTHER PUBLICATIONS

Stern et al, "Design of a formaldehyde photodissociation process for carbon and oxygen isotope separation," Proc. SPIE 1859, Laser Isotope Separation, (May 28, 1993). (Year: 1993).*
Kim Minho, "C-13 Isotope Separation using Photodissociation of Formaldehyde", AJOU University, Aug. 31, 2016, 152 pages (2 pages in english and 150 pages in foreign language).
Office Action dated Aug. 4, 2020 in corresponding Japanese Application No. JP 2019-114181.

* cited by examiner

METHOD FOR SEPARATING CARBON ISOTOPE AND METHOD FOR CONCENTRATING CARBON ISOTOPE USING THE SAME

CROSS-REFERENCE TO RELATED APPLICATION(S)

This application claims benefit of priority to Korean Patent Application No. 10-2018-0148969 filed on Nov. 27, 2018 in the Korean Intellectual Property Office, the disclosure of which is incorporated herein by reference in its entirety.

BACKGROUND

1. Field

The present disclosure relates to a method for separating a carbon isotope and a method for concentrating a carbon isotope using the same, and more particularly, to a method for separating carbon-13 with high selectivity and a method for obtaining highly concentrated carbon-13 in a single stage.

2. Description of Related Art

Carbon has two stable isotopes of carbon-12, having a natural component ratio of 98.89%, and carbon-13, having a natural component ratio of 1.1%, and these carbon-12 and carbon-13 isotopes are industrially very useful. Carbon-13, in which 1.1% carbon-13 is concentrated to a level of 99%, is used as a tracer in chemical, biochemical, and environmental fields. A $^{13}C$-labeled compound such as carbon-13 labeled urea, glucose, or the like, is used for non-invasive diagnosis and in metabolism studies of various diseases. For example, a breath test for diagnosing various diseases by measuring a carbon-13 component ratio of exhalation, after ingesting a compound tagged with carbon-13, has gradually increasing application scope due to diagnosis accuracy and simplicity. The carbon-13 urea breath test ($^{13}C$-UBT) and the carbon-13 methacetin breath test ($^{13}C$-MBT) are commonly used, such that demand for carbon-13 is expected to be significantly increased in the future.

Carbon-13, concentrated to about 99%, is produced at an amount of 1 or more ton per year and is sold at about $100 to $150 per gram. Meanwhile, synthetic diamond and graphene, made with carbon-12, concentrated to a level of 99.95% or more, are known to have thermal conductivity at room temperature at a level about twice as high as that of normal diamond and graphene, such that synthetic diamond and graphene are promising for use as heat dissipation materials. However, 99.95% and 99.99% purity carbon-12 produced by current technology have prices as high as $10 and $20, respectively, such that these high prices act as a constraining factor for wider utilization.

Carbon-13 concentration technology, currently being applied industrially, is only possible using carbon monoxide (CO) and methane ($CH_4$) cryogenic distillation technology. When carbon monoxide and methane are distilled at a temperature of minus 83K, separation factors of carbon-13 per separation unit are 1.01 and 1.005, respectively. In order to concentrate 1.1% carbon-13 to a level of 99%, a distillation column should have a length of several hundred meters. In addition, such cryogenic distillation requires a large scale production facility, and a start-up time, the time taken until a final product is produced after operation, is long as 0.5 years or more, which is also identified as a weak point since it is impossible to respond to market changes in a timely manner.

Japanese Patent No. 6082898 relates to a method for separating a carbon isotope of methane using an activated carbon fiber as an adsorbent, wherein carbon-13 isotope selectivity is about 1.01 at a temperature of 77K, and a method for using a MOF has a limitation in development into commercial technology since the carbon-13 isotope selectivity is as low as 1.1 at a temperature of 200K. U.S. Pat. No. 8,337,802 B2 relates to a method for separating a carbon isotope in which trifluoromethane ($CF_3H$) is multi-photon photodissociated using a carbon dioxide laser with an infrared wavelength, which consumes a large amount of energy, in the range of 97 eV per a molecule for photodissociation, and requires a two-step separation process in order to obtain a level of about 99% of the degree of concentration with respect to carbon-13, wherein an addition of a process of chemical conversion of photodissociation products, $CF_2$ and HF, into $CF_3H$, or the like, is a constraining factor for development of commercial technology.

Therefore, it is expected that a method capable of highly concentrating carbon-13 in a single stage and a photodissociation wavelength of formaldehyde with regard thereto, if provided, will be widely applicable in related fields.

SUMMARY

An aspect of the present disclosure may provide a method for separating a carbon isotope.

An aspect of the present disclosure may also provide a method for concentrating a carbon isotope using the method for separating a carbon isotope.

According to an aspect of the present disclosure, a method for separating a carbon isotope may include cooling formaldehyde gas to a temperature of from 190K to 250K; and obtaining a mixed gas and residual formaldehyde by photodissociating the cooled formaldehyde gas, the mixed gas including carbon dioxide containing a carbon isotope and hydrogen.

According to another aspect of the present disclosure, a method for concentrating a carbon isotope may include obtaining a mixed gas in which carbon monooxide containing a carbon isotope and hydrogen are included, from formaldehyde by the method for separating a carbon isotope as described above.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
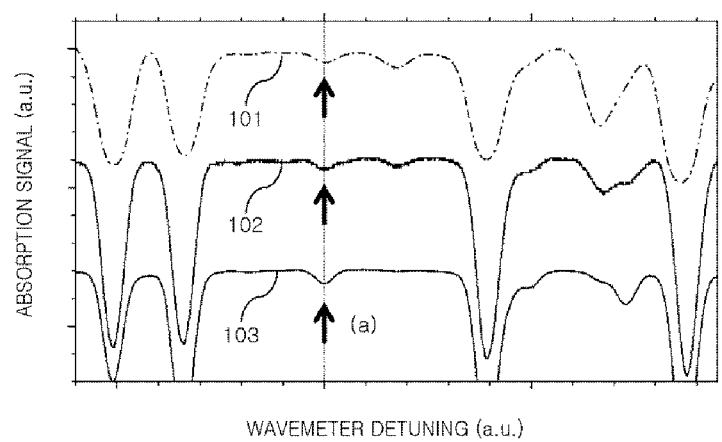
FIG. 1 shows photodissociation spectra of formaldehyde in a region of 28401.3 $cm^{-1}$ (101: a photodissociation spectrum at room temperature (300K) of formaldehyde with natural component ratio, 102: a photodissociation spectrum at 243K of formaldehyde, and 103: a photodissociation spectrum at 203K of formaldehyde)

Embodiments of the present disclosure will now be described in detail with reference to the accompanying drawings.

The present disclosure relates to a technique for separating carbon-13 isotopes in a single stage and highly concentrating carbon-13 isotopes to 98% or more.

More specifically, the method for separating a carbon isotope of the present disclosure includes: cooling a formaldehyde gas to a temperature of from 190K to 250K; and obtaining a mixed gas and residual formaldehyde by photodissociating the cooled formaldehyde gas, the mixed gas including carbon dioxide containing a carbon isotope and hydrogen.

The carbon isotope that is capable of being separated in the present disclosure is carbon-13 ($^{13}$C).

A raw material used for separating the carbon isotope is formaldehyde, which is supplied to a photodissociation reaction part in a gaseous (vapor) state. Formaldehyde has a melting point of minus 92° C. (181K) and a boiling point of minus 21° C. (252K).

Meanwhile, in the present disclosure, a step of cooling the formaldehyde gas to a temperature of from 190K to 250K before photodissociation may be performed. For example, the formaldehyde gas may be cooled to a temperature within a range of 200K to 245K. When a temperature of the formaldehyde gas is less than 190K at the time of the photodissociating, a vapor pressure of formaldehyde is excessively low. When the temperature of the formaldehyde gas exceeds 250K, the selectivity with respect to carbon-13 is reduced.

Here, a method for performing the cooling step is not particularly limited, but may be performed by, for example, a cooling bath or a chiller including a mixture of ethanol and dry ice.

Here, the photodissociating may be performed under a pressure of 0.01 to 5 Torr, for example, a pressure of 0.2 to 1 Torr. There are problems in that productivity is lowered when photodissociation is performed at a pressure less than the above-described pressure range, and in that carbon-13 selectivity and a photodissociation quantum yield are lowered when the photodissociation is performed at a pressure more than the above-described pressure range.

In particular, the present disclosure may irradiate a laser having a specific wavenumber using an optical fiber laser, wherein a wavenumber of a photodissociation laser at the time of the photodissociating is 28396.1 cm$^{-1}$ to 28401.3 cm$^{-1}$, and preferably, 28396.1 cm$^{-1}$, 28401.3 cm$^{-1}$ or a combination thereof. When the laser having a wavenumber described above is applied to formaldehyde, only carbon monoxide containing a carbon-13 isotope may be selectively obtained.

In the present disclosure, the photodissociation laser used in the photodissociation may be an optical fiber laser having high energy efficiency and being easy to maintain and manage, but the present disclosure is not limited thereto. The optical fiber laser, which refers to a laser having an active medium in an optical fiber, is an optical fiber laser in which a rare-earth halide with a low level is added to an excitation medium. The optical fiber laser is small, light, easy to maintain and manage, and particularly has high energy efficiency and has a wide oscillation wavelength range, such that the output may be controlled over a wide range. Accordingly, the optical fiber laser is preferable for application in the present disclosure since the wavenumber for photodissociation of formaldehyde may be selectively generated.

Meanwhile, the present disclosure may further include: after the obtaining of the mixed gas and the residual formaldehyde, the mixed gas including carbon dioxide containing a carbon isotope and hydrogen, separating the residual formaldehyde by cooling and condensing the mixed gas and the residual formaldehyde.

By this process, formaldehyde that is not photodissociated in the photodissociation process may be recovered and discharged, and $H_2$ and $^{13}CO$ which are photodissociation products obtained by the photodissociation may be separated and recovered. Here, hydrogen and carbon monoxide containing carbon-13, which are products formed by the photodissociation, and formaldehyde, which is present without being photodissociated may be recovered by cooling and condensation. The non-photodissociated formaldehyde has a freezing point of −92° C., and may be condensed by cooling to below freezing point. Therefore, the cooling and condensing may be performed at a temperature of 181K (−92° C.) or less, for example, at a temperature of 70K to 180K, and preferably 77K to 130K.

Here, hydrogen and carbon monoxide still remain in a gaseous state even under the condition of formaldehyde condensation, such that hydrogen and carbon monoxide, which are photodissociation reaction products, may be recovered in a gaseous state and separated from formaldehyde.

Meanwhile, the carbon monoxide generated by the photodissociation of formaldehyde as described above contains a carbon isotope $^{13}$C. Thus, the carbon isotope may be recovered by a catalytic oxidation reaction of the residual photodissociation product containing carbon monoxide and hydrogen.

Therefore, according to another aspect of the present disclosure, there is provided a method for concentrating a carbon isotope, which includes: obtaining a mixed gas in which carbon monooxide containing a carbon isotope and hydrogen are included, from formaldehyde, by the method for separating a carbon isotope as described above.

The carbon monoxide containing the carbon isotope is $^{13}$C-containing carbon monoxide ($^{13}CO$).

Further, an oxidation step in which oxygen is added to the mixed gas and an oxidation reaction is performed to synthesize water and carbon dioxide containing a carbon isotope may be further performed. Specifically, hydrogen and carbon monoxide generated by the photodissociation reaction of formaldehyde are separated and recovered, then oxygen is supplied thereto, followed by catalytic oxidation, to produce water ($H_2O$) and carbon dioxide ($CO_2$), and water is condensed to recover carbon dioxide, thereby extracting carbon dioxide in which the carbon isotope is concentrated as a final product.

In this process, oxygen is supplied from the outside, but there is no change in the degree of concentration of carbon isotope.

A catalyst that is usable in the catalytic oxidation reaction is a catalyst commonly used in the art and is not particularly limited. For example, the catalyst may be Cu—Ce.

As described above, according to the present disclosure, carbon-13 may be highly concentrated at a high yield of 98% or more in a single stage. Further, in the present disclosure, since the carbon-13 isotope selectivity is 4,000 to 10,000, the carbon-13 isotope may be separated by intensively applying energy only on the carbon-13 with the component ratio of 1.1%, such that mass production by small-scale facilities may be achieved with high energy efficiency. When the present disclosure is applied, the production cost of the concentrated carbon-13 may be greatly reduced, thereby contributing to various applications of carbon-13.

Hereinafter, the present disclosure is described in more detail with reference to Inventive Examples. The following Inventive Examples are provided for illustrative purposes only, and the scope of the present disclosure is not limited thereto.

Inventive Examples

1. Confirmation of Photodissociation Wavelength of Formaldehyde Useful for Carbon-13 Isotope Separation When a formaldehyde ($H_2CO$) gas was irradiated with ultraviolet light in the wavelength range of 340 to 360 nm, the formaldehyde was photodissociated into hydrogen molecule ($H_2$) and carbon monoxide (CO) as shown in Equation (1) as follows. Here, a photodissociation quantum yield was about 0.85 at 10 Torr and was high as 0.9 or more at 5 Torr or less.

$$H_2CO + h\nu \rightarrow H_2 + CO \quad \text{Equation (1)}$$

Figure 2:
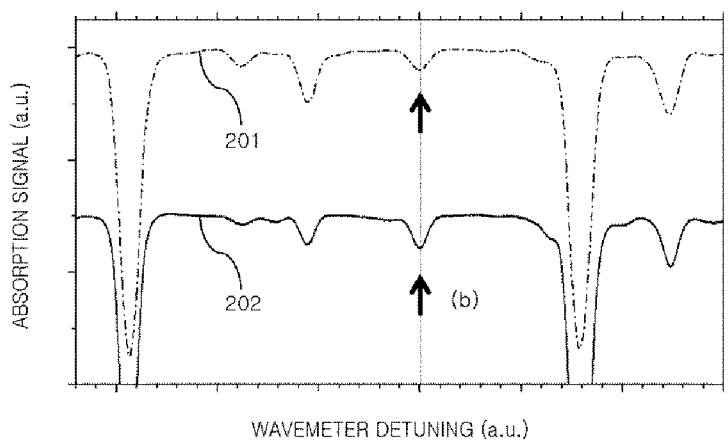
FIG. 2 shows photodissociation spectra of formaldehyde in a region of 28396.1 $cm^{-1}$ (201: a photodissociation spectrum at room temperature (300K) of formaldehyde with natural component ratio, and 202: a photodissociation spectrum at 203K of formaldehyde)

FIGS. 1 and 2 are formaldehyde photodissociation spectra measured with a single mode laser having a narrow linewidth of 60 MHz. In FIGS. 1 and 2, the reference numerals 101 and 201 denote photodissociation spectra of formaldehyde with the natural component ratio measured at room temperature, the reference numeral 102 denotes a photodissociation spectrum of formaldehyde measured at 243K, and the reference numerals 103 and 202 denote photodissociation spectra of formaldehyde measured at 203K.

FIG. 1(a) and FIG. 2(b) show photodissociation wavelengths useful for separating and concentrating the carbon-13 isotope to 98% or more in a single stage, corresponding to laser wavenumber of 28401.3 $cm^{-1}$ and 28396.1 $cm^{-1}$, respectively.

Figure 3:
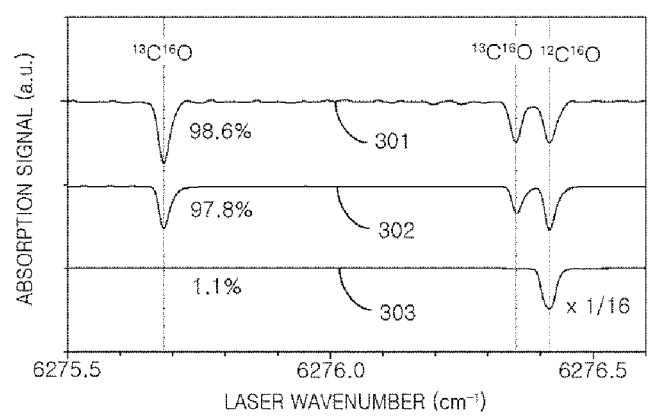
FIG. 3 shows measurement results of carbon-13 component ratios of carbon monoxide generated by photodissociation of formaldehyde when a laser frequency is 28401.3 cm$^{-1}$ (301: a carbon-13 component ratio (98.6%) of a low temperature (243K)-photodissociated product, 302: a carbon-13 component ratio (97.8%) of a room temperature-photodissociated product, and 303: carbon monoxide with a natural component ratio (1.1%))

When formaldehyde was photodissociated at room temperature with a laser having a laser wavenumber of 28401.3 $cm^{-1}$, the carbon-13 isotope selectivity was measured to be about 4,000, and the carbon-13 selectivity at 243K was measured to be about 7,000 (see FIG. 3). Thus, when photodissociation at 203K was performed, the carbon-13 selectivity was 10,000 or more, and thus it was determined that 99% or more of the carbon-13 could be obtained in the concentration process with a single stage. Here, the isotope selectivity S may be defined by Equation (2) as follows.

$$S = \frac{C_P/(1-C_P)}{C_F/(1-C_F)} \quad \text{Equation (2)}$$

In Equation (2), CF is a carbon-13 isotope component ratio of a raw material, and CP is a carbon-13 component ratio of a product.

2. Separation of Highly Selective Carbon-13

Inventive Example 1

Figure 4:
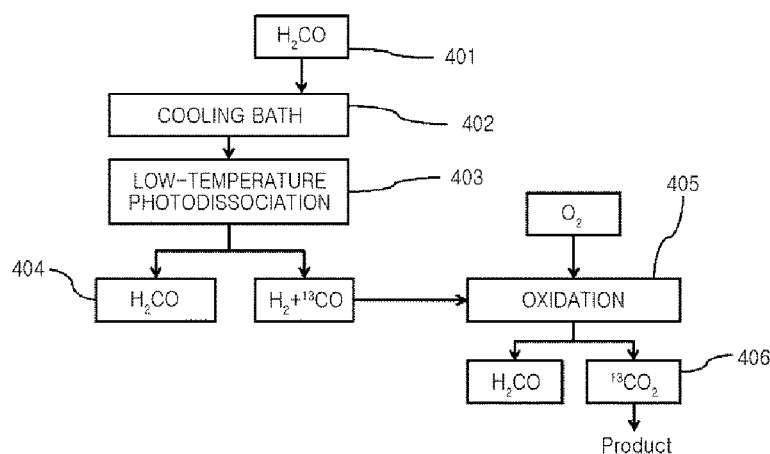
FIG. 4 shows a carbon-13 separation process by low temperature photodissociation (401: formaldehyde gas supply (200-250K), 402: cooling bath of formaldehyde gas (200-250K), 403: low temperature photodissociation apparatus of formaldehyde (200-250K), 404: formaldehyde trapping apparatus (100K), 405: carbon monoxide oxidizing apparatus, and 406: carbon-13 carbon dioxide trapping apparatus).

FIG. 4 shows a carbon-13 separation process by low temperature photodissociation. More specifically, the formaldehyde gas supplied from an anhydrous formaldehyde (401) storage was cooled to a predetermined temperature of from 190K to 250K by a cooling bath 402, and injected into a photodissociation apparatus 403, wherein a pressure of the photodissociation apparatus was set to 0.2 to 1 Torr. For the cooling bath 402, a mixture of ethanol and dry ice may be used, or a chiller may be used. The carbon-13 formaldehyde could be photodissociated with a high selectivity in the photodissociation apparatus 403 in which the temperature was kept constant in the range of 200K to 245K, wherein in Inventive Example 1, the photodissociation was performed at a temperature of 243K under a pressure of 0.2 Torr with a wavenumber of 28401.3 $cm^{-1}$.

The residual formaldehyde could be captured in an apparatus cooled with liquid nitrogen (liquid-nitrogen trap, 404) and separated from the synthesis gas, which is a photodissociation product.

Further, the synthesis gas could be converted into carbon-13 carbon dioxide by Equation (3) below in an oxidation apparatus 405 to which oxygen was further supplied, and could be stored (406).

$$H_2 + {}^{13}CO + O_2 \rightarrow H_2O + {}^{13}CO_2 \quad \text{Equation (3)}$$

By this process, the present disclosure could highly concentrate carbon-13 to 98% or more in a single stage.

Inventive Example 2

Formaldehyde was photodissociated by the same procedure as in Example 1, except that the photodissociation of formaldehyde was performed at 203K when a laser frequency was 28401.3 $cm^{-1}$.

Inventive Example 3

Formaldehyde was photodissociated by the same procedure as in Example 1, except that the photodissociation of formaldehyde was performed at 203K when a laser frequency was 28396.1 $cm^{-1}$.

Comparative Example 1

Formaldehyde was photodissociated by the same procedure as in Example 1, except that the photodissociation of formaldehyde was performed at room temperature (300K) when a laser frequency was 28401.3 $cm^{-1}$.

Comparative Example 2

Formaldehyde was photodissociated by the same procedure as in Example 1, except that the photodissociation of formaldehyde was performed at room temperature (300K) when a laser frequency was 28396.1 $cm^{-1}$.

3. Measurement of Carbon-13 Component Ratio of Carbon Monoxide Generated by Photodissociation of Formaldehyde According to Present Disclosure FIG. 3 shows measurement results of carbon-13 component ratios of carbon monoxide generated by photodissociation of formaldehyde when a laser frequency is 28401.3 cm$^{-1}$.

More specifically, the reference numeral 301 denotes photodissociation at 243K according to Inventive Example 1, wherein the carbon-13 component ratio was measured to be 98.6% and the carbon-13 selectivity was measured to be about 7,000.

On the other hand, the reference numeral 302 denotes room temperature photodissociation according to Comparative Example 1, wherein the carbon-13 component ratio was 97.8% and the carbon-13 selectivity was about 4,000.

Meanwhile, the reference numeral 303 denotes carbon-13 with the natural component ratio of 1.1%.

As a result, it could be confirmed that in Inventive Example 1 according to the present disclosure, since the carbon-13 isotope selectivity was 4,000 to 10,000, the carbon-13 isotope could be separated by intensively applying energy only on the carbon-13 with the component ratio of 1.1%, such that mass production by small-scale facilities could be achieved with high energy efficiency. When the present disclosure is applied, the production cost of the concentrated carbon-13 may be greatly reduced, thereby contributing to various applications of carbon-13.

According to the present disclosure, carbon-13 may be highly concentrated at a high yield of 98% or more in a single stage. Further, in the present disclosure, since the carbon-13 isotope selectivity is 4,000 to 10,000, the carbon-13 isotope may be separated by intensively applying energy only on the carbon-13 with the component ratio of 1.1%, such that mass production by small-scale facilities may be achieved with high energy efficiency. When the present disclosure is applied, the production cost of the concentrated carbon-13 may be greatly reduced, thereby contributing to various applications of carbon-13.

While the present disclosure has been shown and described in connection with the embodiments, it will be apparent to those skilled in the art that modifications and variations can be made without departing from the spirit and scope of the disclosure as defined by the appended claims.

What is claimed is:

1. A method for separating a carbon isotope ($^{13}$C) comprising: cooling a formaldehyde gas to a temperature of from 190K to 250K; and obtaining a mixed gas and residual formaldehyde by photodissociating the cooled formaldehyde gas, the mixed gas including carbon monoxide containing the carbon isotope ($^{13}$C) and hydrogen wherein a wavenumber of a photodissociation laser at the time of the photodissociating is 28396.1 cm$^{-1}$, 28401.3 cm$^{-1}$ or a combination thereof.

2. The method of claim 1, wherein the cooling is performed by a cooling bath or a chiller including a mixture of ethanol and dry ice.

3. The method of claim 1, wherein the photodissociating is performed under a pressure of 0.01 to 5 Torr.

4. The method of claim 1, wherein the photodissociation laser used at the time of the photodissociating is an optical fiber laser.

5. The method of claim 1, further comprising: after the obtaining of the mixed gas and the residual formaldehyde, the mixed gas including carbon monoxide containing the carbon isotope ($^{13}$C) and hydrogen, separating the residual formaldehyde by cooling and condensing the mixed gas and the residual formaldehyde.

6. The method of claim 5, wherein the cooling and condensing is performed at a temperature of 181K (−92° C.) or less.

7. A method for concentrating a carbon isotope ($^{13}$C) comprising: obtaining the mixed gas in which carbon monoxide containing the carbon isotope ($^{13}$C) and hydrogen are included, from formaldehyde by the method for separating the carbon isotope ($^{13}$C) of claim 1.

\* \* \* \* \*